E. O. ERIKSSON.
BOILER CLEANING DEVICE.
APPLICATION FILED MAY 5, 1917.
1,275,009.
Patented Aug. 6, 1918.
2 SHEETS—SHEET 1.
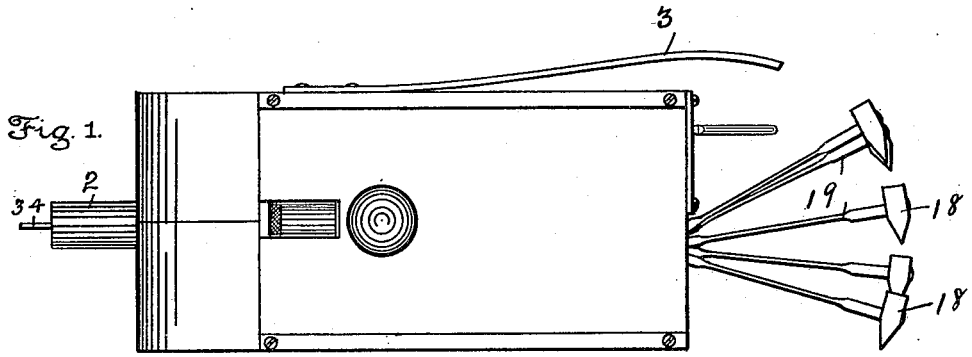
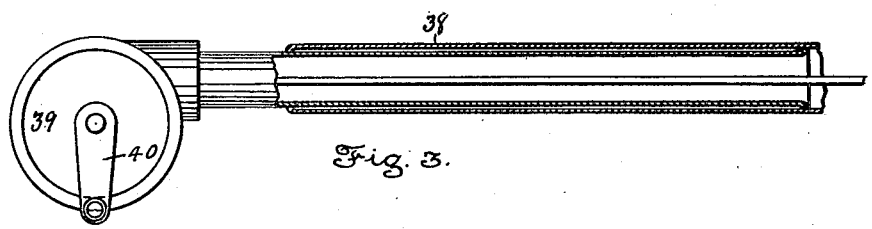
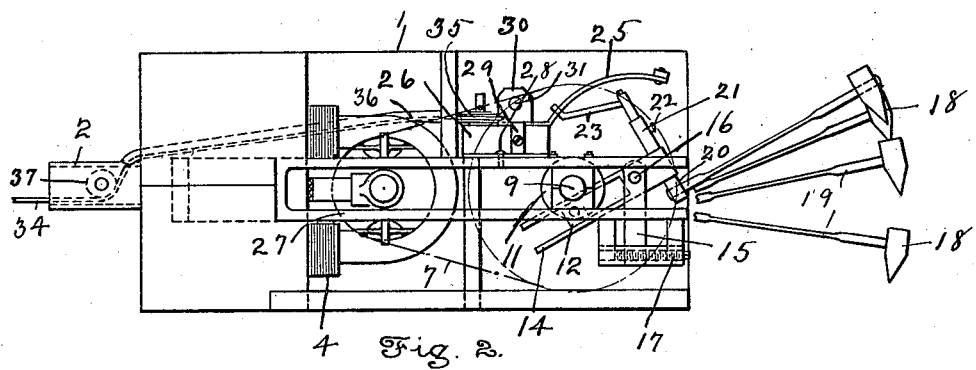

E. O. ERIKSSON.
BOILER CLEANING DEVICE.
APPLICATION FILED MAY 5, 1917.

1,275,009.

Patented Aug. 6, 1918.
2 SHEETS—SHEET 2.

Witnesses:
Henry Watson
Shelma Benley

Inventor:
Erik O. Eriksson
By Chapin A Ferguson
Attorney.

UNITED STATES PATENT OFFICE.

ERIK O. ERIKSSON, OF BALTIMORE, MARYLAND.

BOILER-CLEANING DEVICE.

1,275,009.

Specification of Letters Patent.

Patented Aug. 6, 1918.

Application filed May 5, 1917. Serial No. 166,548.

*To all whom it may concern:*

Be it known that I, ERIK O. ERIKSSON, a citizen of the United States, residing at Baltimore, in the State of Maryland, have invented certain new and useful Improvements in Boiler-Cleaning Devices, of which the following is a specification.

This invention relates to improvements in boiler cleaning devices, and has for its object to provide a device by means of which the scale can be readily and quickly removed from the inner surface of the combustion chamber.

The invention consists of the novel construction and arrangement of the parts and combination of parts hereinafter more fully set forth in the following specification and pointed out in detail in the appended claims.

In the accompanying drawings,—

Figure 1 is a side elevation of my invention, the handle being removed.

Fig. 2 is a side elevation similar to Fig. 1, with the side of the casing removed.

Fig. 3 is a detail view of the outer end of the adjustable handle.

Figure 4:
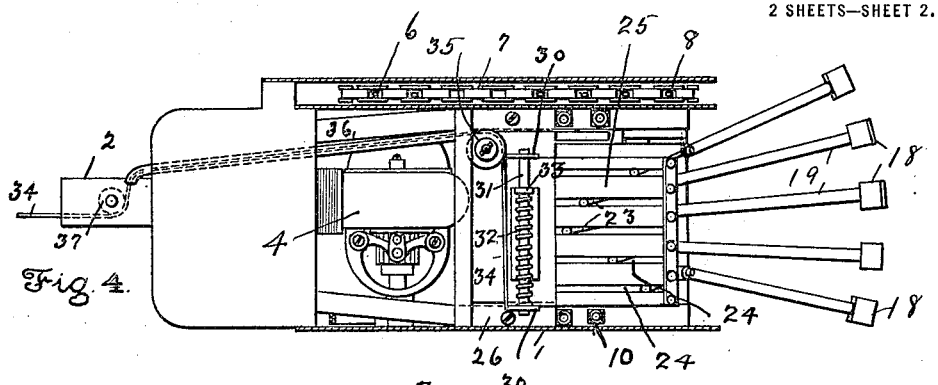
Fig. 4 is a top plan view of Fig. 1, with the top of the casing removed.
Figure 5:
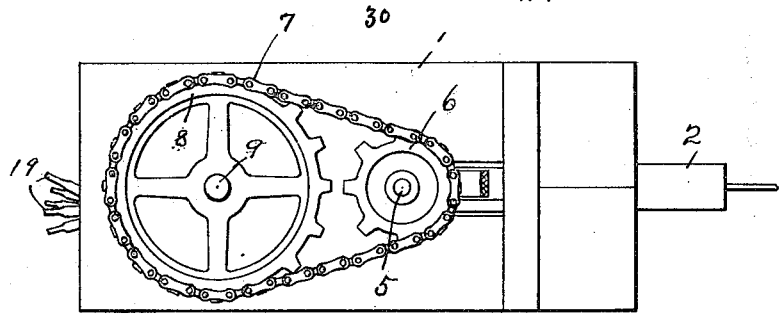
Fig. 5 is a side elevation, with the side of the casing removed, and looking from the opposite side to that shown in Fig. 2.
Figure 6:
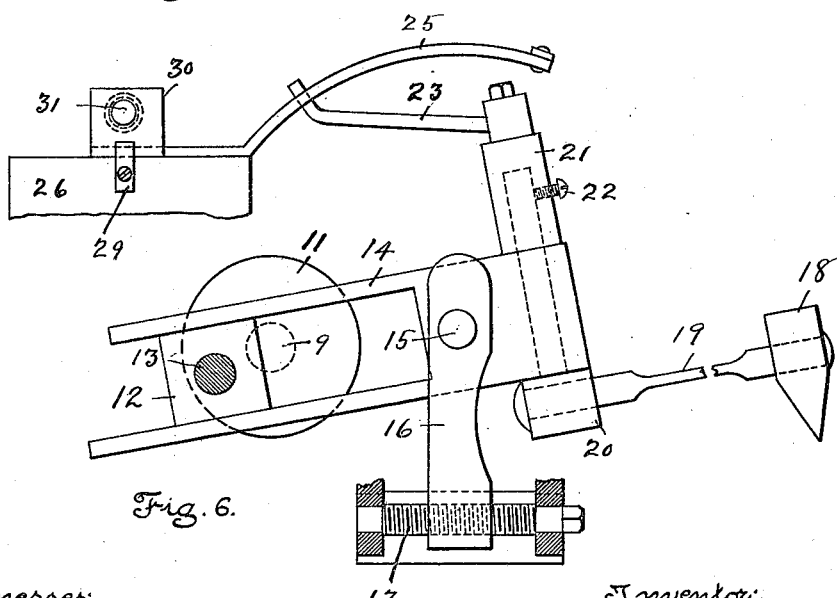
Fig. 6 is an enlarged detail of one of the cutting heads and its operating parts.

Referring to the accompanying drawings, forming part of this specification, and in which like reference numerals designate like parts throughout the several views thereof, 1 designates the casing at the rear of which projects a tube 2, and a stationary handle 3 is secured to the top of the casing. Within said casing 1, near the rear thereof, is an electric motor 4, by means of which the device is operated.

On one end of the motor-shaft 5 is a sprocket-wheel 6 which is connected by a chain 7 to the sprocket-wheel 8 on the outer end of the cam-shaft 9. The said cam-shaft 9 is mounted in the bearings 10 and has a number of disks 11 secured thereto, between which are secured the blocks 12 held thereto by the pins 13. The said blocks 12 between said disks 11 are arranged in a staggered position with relation to each other so that the cutting heads will work alternately. Each of said blocks 12 slide in and operate a yoke 14, each of which latter is pivoted at 15 to a post 16. The said posts 16 having their lower ends fitted upon the screws 17 by means of which latter the said posts can be moved back and forth to adjust the stroke of the cutting heads 18. The said cutting heads 18 are each secured to an arm 19 which latter is secured to the lower end of the pin 20. The said pins 20 pass through the end of the yokes 14 and have a sleeve 21 secured to the upper end thereof and held thereto by the set screw 22. To the upper end of each sleeve 21 is secured an arm 23 having one end projecting therefrom, said arm having its outer end bent and projecting through one of the slots 24 in the curved plate 25. The said curved plate 25 is slidably secured to the top of a plate 26 secured to the frame 27 at 28. The said plate 26 is provided with a strip 29 fitting in a groove in the lower surface of the curved plate 25 and serves as a guide for the latter. The curved plate 25 is provided with an upwardly projecting ear 30 at each side in which is secured the rod 31, over which latter is fitted a coiled spring 32. The said coiled spring 32 has one end impinging against one of the ears 30 of the curved plate 25 and the other end against the stationary bearing 33 on the plate 26, and serves to hold the sliding curved plate 25 to its normal position. A cord, wire or chain 34 has one end secured to one of the ears 30 passes over the pulley 35 and through the tube 36 and over the pulley 37 through the handle 38 to a spring drum in the end 39 of the said handle 38. The said drum being adapted to be moved by the crank 40, to cause the cord 34 to throw the curved plate 25 over against the action of the spring 32 and move the cutting heads sidewise, when the crank is released the coiled spring 32 will return the plate 25 and consequently the cutting heads to their normal position. The sidewise movement of the cutting heads permits of cutting over a wider surface without moving the casing. The handle 38 is composed of sections adapted to telescope and when the handle is extended the cord 34 will unwind from the drum against the action of its spring and as the handle is shortened by sliding the sections together the action of the spring will cause the said cord 34 to wind on the drum, thus always keeping the said cord taut.

The operation of the device is as follows:

When the current is applied to the motor power will be transmitted through the chain 7 to the shaft 9. The revolving of the shaft 9 causes the yokes 14 to rock on their bearings and imparting a reciprocating motion to the cutting heads being so arranged as to operate alternately and their cutting edge coming into contact with the scale on the surface of the combustion chamber in rapid succession will quickly remove said scale.

Having thus described my invention, what I claim is:

1. A boiler cleaning device comprising a casing, a motor secured within said casing, a shaft mounted in said casing and driven from said motor, a number of cutting heads, means connecting said pivoted cutting heads with said shaft, and means for moving said cutting heads sidewise.

2. A boiler cleaning device comprising a casing, a shaft mounted in said casing, means for driving said shaft, a number of cutting heads independently connected to said shaft and adapted to be reciprocated alternately thereby, a handle secured to said casing, means passing through said handle for moving said cutting heads sidewise, and means for independently adjusting the stroke of said cutting heads.

In testimony whereof I affix my signature in the presence of two witnesses.

ERIK O. ERIKSSON.

Witnesses:
WILLIAM F. PODLICH,
CHAPIN A. FERGUSON.

Copies of this patent may be obtained for five cents each, by addressing the "Commissioner of Patents, Washington, D. C."